United States Patent [19]

Anderson

[11] Patent Number: 4,854,299
[45] Date of Patent: Aug. 8, 1989

[54] DEEP FAT FOOD COOKER HAVING A FAT PRE-WARMER

[76] Inventor: Edward M. Anderson, 2620 East Medicine Lake Blvd., Minneapolis, Minn. 55441

[21] Appl. No.: 612,580

[22] Filed: May 21, 1984

[51] Int. Cl.[4] .............................................. A47J 27/00
[52] U.S. Cl. ..................................... 126/380; 176/391; 176/390; 99/403; 99/409; 219/439
[58] Field of Search ............... 126/375, 380, 383, 385, 126/390, 391; 99/403, 409; 219/327, 438, 439, 441; 220/23.4, 23.83, 23.86; 248/311.2, 311.3, 313, 309.1, 316.7

[56] References Cited

U.S. PATENT DOCUMENTS

| | | | |
|---|---|---|---|
| 1,237,622 | 8/1987 | Dickinson | 126/373 |
| 1,948,932 | 2/1934 | McMickle | 220/23.83 X |
| 2,769,387 | 11/1956 | Penick | 219/242 X |
| 3,089,317 | 5/1963 | Bufalini | 220/23.83 X |
| 3,172,346 | 3/1965 | Siskind et al. | 220/23.83 X |
| 3,218,959 | 11/1965 | Swisher | 99/409 X |

FOREIGN PATENT DOCUMENTS 616112  1/1927  France ................................ 126/390
47912  12/1979  U.S.S.R. ............................. 99/409

Primary Examiner—Randall L. Green
Attorney, Agent, or Firm—Henry C. Kovar

[57] ABSTRACT

A deep fat food cooker has vat for cooking oil, a pre-warmer container on the outside of the vat for cooking oil to be pre-warmed before use in the cooker, and a thermal extracter to extract heat from heated oil in the vat and to transfer the extracted heat to oil in the container; the container is deep drawn thermally conductive aluminum and has an elongate side in heat exchange relationship with a side wall of the vat; the thermal extractor is thermally conductive aluminum sheet and has a dip member in the heated oil, a cradle to support the container on the outside of the vat, and an upright wall between the container and the vat outside wall to also transfer heat through the wall; oil in the container receives heat from the extractor and through the vat wall and upright wall, all of the heat is taken from the previously heated oil in the vat. A method of pre-warming cooking oil includes the steps of heating oil in the vat, extracting heat from the heated oil, and transferring the extracted heat into a discrete exterior oil warming container and the oil therein.

5 Claims, 1 Drawing Sheet

DEEP FAT FOOD COOKER HAVING A FAT PRE-WARMER

BACKGROUND OF THE INVENTION

1. Field of the Invention

This invention pertains to a deep fat food fryer having an exterior container for pre-warming cooking fat, to a pre-warmer for food cooking fat, and to a method of pre-warming food cooking fat.

2. The Prior Art

Commercial food cooking fat typically comes in solid form because solid form is less costly than the liquid cooking oils which are popular for domestic use.

Deep fat fryers need to be periodically refilled during use and while food is being cooked. It is the cooking of food that consumes the oil. Specifically when food is being cooked, as food is removed a certain amount of cooking oil is also removed. When food is not being cooked, oil is not being used. In some circumstances solid type cooking oil has a further advantage in that the cooker can be transported filled with solid phase oil and there is no danger of spillage. This is particularly important for carnival equipment and special event equipment for sidewalk sales, fund raisers, private parties and the like.

To refill a cooker, when using solid cooking oil, the oil needs to be scooped with a ladle, spatula, spoon or the like and it must be heated before placement into the vat of the cooker. The temperture of the cooking oil is very important. If the oil is too cool, the food becomes soggy when cooked and has too high an oil content. The customer is unhappy and the retailer loses excessive oil and repeat sales. Typically centralized and complete kitchens pre-heat their cooking oil in a separate pot on a separate stove. This can be easily done in a kitchen but cannot be done in a small stand or concession not having a separate range. Further, over heating of oil is a common occurance during pre-warming. The oil smokes, and begins polymerization and is irreversibly thermally stressed. This is common to both liquid and solid cooking oils.

Then, the pre-heated oil may have to be carried from a remote range to the cooker and the opportunity for spillage and personal injury arises.

It should be understood that cooking oil and cooking fat and cooking grease are one and the same thing; it just depends upon whom you're talking to. Food cooker and food fryer are also different terms for the same thing.

OBJECT OF THE INVENTION

It is an object of the present invention to provide a food cooking fat pre-warmer for a deep fat fryer that utilizes heat from the heated fat in a cooker for pre-warming the new fat.

It is an object of the present invention to provide a food cooking fat pre-warmer for the outside of a food cooker that extracts heat from heated fat within the cooker.

It is an object of the present invention to provide a deep fat food cooker having a fat pre-warmer outside of the fryer vat and a thermal extractor between the vat and the pre-warmer.

It is an object of the present invention to provide a deep fat food cooker having a fat pre-warmer outside of its vat and in heat exchange relationship with hot cooking oil in the vat.

It is an object of the present invention to provide a method of pre-warming cooking oil in which heat is extracted from hot oil in a cooking vat.

It is an object of the present invention to provide a method of pre-warming cooking oil outside of a vat, in which heat is extracted from hot oil in the vat and transferred to oil outside of the vat.

These and other objects of the invention will become manifest to those versed in the art upon reference to and review of the teachings herein.

SUMMARY OF THE INVENTION

According to the principles of the present invention, a fat pre-warmer for a deep fat food cooker has a thermally conductive pre-warmer container, and a thermally conductive container support having structure for engaging and being supported by a cooker, and a thermally conductive dip member immersible in fat in the cooker.

A fat pre-warmer has a thermally conductive pre-warmer container, and a thermally conductive structure for supporting the container on the outside of a deep fat food cooker and in heat exchange relationship with the inside of a cooking vat.

A deep fat food cooker having a fat pre-warmer has a cooking vat for fat, a pre-warmer container outside of the vat, and a thermal extractor betwen the vat and the container, the extractor has a dip member submersible in cooking fat and thermally conductive structure extending from the dip member to the container.

A deep fat food cooker having a fat pre-warmer has a cooking vat for fat, a thermally conductive fat pre-warmer container outside of the vat, and structure supporting the container in heat exchange relationship with cooking oil inside of the vat.

A method of pre-warming food cooking oil for a deep fat food cooker has the steps of heating oil in the cooker vat, extracting heat from the heated oil, and transferring the extracted heat into a discrete quantity of oil outside of the vat.

A method of pre-warming food cooking oil for a deep fat food cooker has the steps of heating oil in a cooker vat and then transferring heat from the heated oil through a discrete container wall and into a discrete quantity of oil outside of the vat and in the container.

DESCRIPTION OF THE PREFERRED EMBODIMENT

Figure 1:
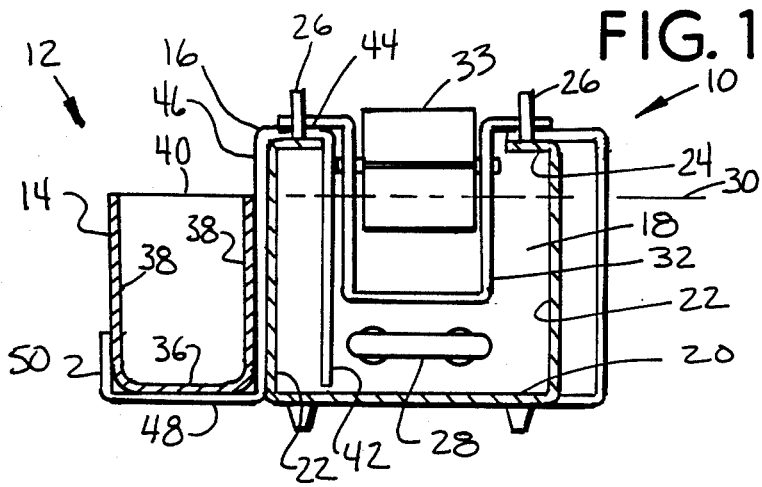
FIG. 1 is an elevational end view in partial section of a deep fat food cooker according to the present invention, showing the fat pre-warmer of the present invention and usable in the practice of the method of the present invention.

According to the principles of the present invention, a deep fat food cooker shown in FIG. 1 and generally indicated by the numeral 10 has a fat pre-warmer generally indicated by the numeral 12. The pre-warmer 12 has a container 14 and a thermal extractor 16.

The cooker 10 includes a cooking fat vat 18 having a bottom 20, and a pair of metal side walls 22. At the top of each side wall 22 is an inward extending ledge 24. Each ledge 24 has one or more latch pins 26. An electric resistance heater element 28 is provided to heat cooking oil within the vat 18. The normal level of cooking oil in the vat 18 is indicated by the level line 30. Within the vat 18 is an inverted hat-section shaped fry channel 32 having a rotating paddlewheel 33 driven by an electric motor (not shown) for continually propelling heated cooking oil down the inside of the channel 32 and back over the heater 28 between the bottom 20 and the channel 32. The fry channel 32 has keyholes 34 for positive securement to the latch pins 26.

Figure 2:
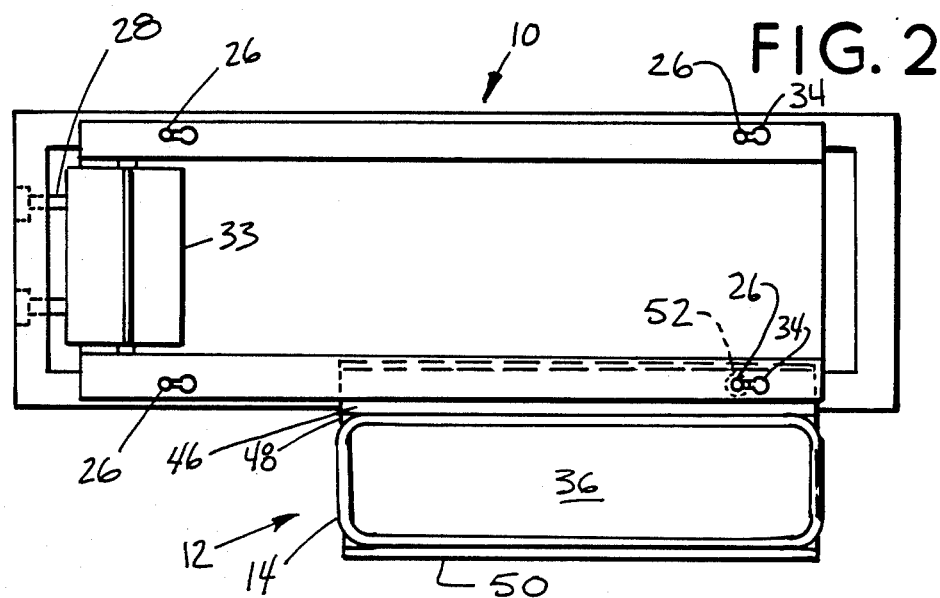
FIG. 2 is a top plan view thereof.
Figure 3:
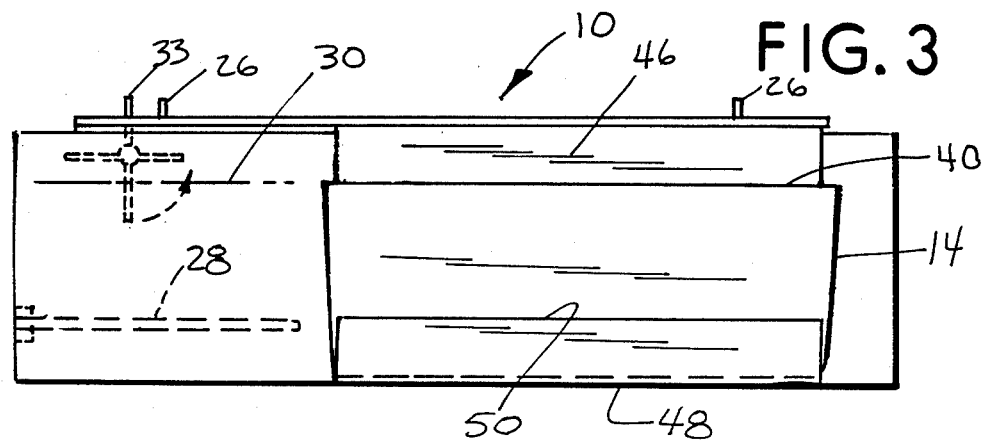
FIG. 3 is an elevational view of the front side thereof.

The pre-warmer container 14 is an elongate deep drawn thermally conductive aluminum container 14 having a rectangular shape from above as best seen in FIG. 2. The container has a bottom 36 preferably coplanar with the vat bottom 20, and elongate front and rear walls 38 one of which is placed toward the vat 18. The container 14 preferably has a top 40 that is generally at the same height as the normal cooking oil level 30.

The thermal extractor 16 is a combination extractor and support and doubles as a support for the pre-warmer container 14. The extractor 16 is an elongate section of thermally conductive aluminum sheet metal. The extractor 16 has a dip member extending downwardly into the vat 18, a cap 44 extending over the ledge 24, an upright wall 46 extending downward from the cap 44 to a cradle 48 under the container 14. The cradle 48 has an outside flange 50 which biases the container 14 against the upright wall 46. The cap 44 has one or more apertures 52 which slip over the latch pins 26 and positively locate the extractor 16 on the cooker 10. The extractor 16 has a length at least as long as the container bottom 36. The upright wall 46 and the dip member 42 are approximately the same length as each other, the dip member 42 preferably hangs below the level of the fry channel 32. The upright wall 46 and the container rear wall 38 which is adjacent to the upright wall 46, hang against and are in a thermal heat exchange relationship with the vat side wall 22. The extractor 16 also is a support for the container 14 and is suspended from the cooker 10 by contact of the cap 44 onto the ledge 24. The fry channel 32 goes on atop the extractor 16 and positively locks the extractor 16 to the cooker 10.

In operation and use of the cooker 10 and the pre-warmer 12, and in the practice of the method of the present invention, the vat 18 is initially filled to the level line 30 with cooking oil, fat or grease, whichever you prefer to call it. The cooking oil is heated to about 375 degrees F which is the normal cooking temperature. The syphon 16 is dropped onto the vat 18 and the dip member 42 is immersed in the hot cooking oil. The container 14 is partially filled with unheated cooking oil and placed upon the cradle 48 and in contact with and in heat exchange relationship with the extractor 16. The extractor supports the container 14 and the cooking oil therein. The paddlewheel 34 continually propells heated cooking oil from the heater 28 down the cooking track and then over the dip member 42 and then to the heater 28 to be reheated. The dip member 42 extracts heat up and out of the heated cooking oil in the vat 18. The heat is transferred up and over across the cap 44 and then down the upright wall 46 to cradle 48, and conductively from the upright wall 46 and cradle 48 into the container 14 and through the container 14 and into the new unused discrete cooking oil in the container 14. The solid cooking fat is easily liquified in the pre-warmer 12.

Further heat transfer can take place through the vat side wall 22 and through the upright wall 46, through the container 14 and into the cooking oil in the container 14.

The cooking oil in the container 14 will always be at a lower temperature then the cooking oil in the vat 18, the pre-warmed oil suffers virtually no polymerization, heat shock or oxidation. There are no further heaters or controls to increase cost, complexity, down-time and maintenance. The container 14 can easily be emptied into the vat 18. The container 14 can be refilled without significantly affecting the temperature of the oil in the vat 18 or the ability of cooker 10 to be able to deep fry. The container 14 is always in view of the person operating the cooker 10 and there is little chance of running out of oil, or of leaving the oil unattended upon a separate range, and burning the oil or starting a fire.

Both the container 14 and the extractor 16 can be easily washed, and both can be run through a dishwasher. The container 14 can also be removed and pre-warmed on a range if so desired at the beginning of a business cycle for the cooker 10. The container 14 also can be removed early on toward the end of the day to speed shur-down of the cooker 10.

The pre-warmer 12 is particularly valuable at carnivals wherein there are no range facilities to pre-warm the oil. A specific cooker 10 upon which the pre-warmer 12 is particularly useful is a donut making machine for regular or miniature donuts.

Although other advantages may be found and realized, and various and minor modifications suggested by those versed in the art, be it understood that I wish to embody within the scope of the patent warranted hereon, all such embodiments as reasonably and properly come within the scope of my contribution to the art.

I claim as my invention:

1. A cooking fat pre-warmer for a deep fat food cooker having upright side walls forming a central hot cooking oil vat having cooking oil therein, comprising:
  (a) a thermally conductive and discrete metal pre-warmer container for cooking fat; and
  (b) an elongate thermally conductive metal container support for the container, said support being structurally discrete and separable from the container and having;
    (1) a cradle having a flat upright facing surface upon which said container is removably supportable, with a bottom of the container being in direct and heat exchange contact with said cradle,
    (2) an upright support wall extending upward from an inner side of the cradle, said upright wall being integral with said cradle and having a height greater than a height of said container,
    (3) a cap integral with the upright support wall and the cradle and extending transversely from a top of the wall and in a direction away from said cradle,
    (4) biasing means on the cradle and spaced transversely outward from the upright wall for engaging and biasing the fat container against said upright wall, and
    (5) a downward extending thermally conductive dip member extending downward from the cap and being extendable into the vat and being submersible in said cooking oil in the cooker vat, said dip member being structurally and thermally integral with said cap and said upright wall, said dip member being spaced transversely from said upright wall and being in thermal communication with said container through said cap, upright wall and cradle for extracting heat directly from the hot oil in the vat and for conducting the extracted heat to oil in the container via the cap, upright wall, cradle and lastly through the container, with (c) said container being removable with warm oil therein from said container support while said container support remains upon the food cooker with the dip member in the vat and in hot oil, and with said container support resting upon a side wall of the cooker.

2. A fat pre-warmer according to claim 1, in which said dip member is generally parallel to the upright wall, in which said dip member has an elongate length at least as long as a bottom of the container, and in which the container is also elongate and has generally parallel upright front and rear walls, and in which the support is a contiguous piece of sheet metal formed by said cradle, upright wall, cap, and dip member all being integral, with said dip member, cap and upright wall forming an inverted U-shape, and with said upright wall, cradle and biasing means forming an upright U-shape.

3. A cooking fat pre-warmer according to claim 1, in which a flat bottom of the container is generally co-planar with a bottom of the vat, in which the container is elongate and of rectangular shape when seen from above, with one of a pair of long container walls being in contacting heat exchange relationship with a vat side wall through the upright support wall.

4. A cooking fat pre-warmer according to claim 1, in which the vat has therein a fry channel normally partially immersed in the hot cooking oil, said dip member extending below the fry channel with an electric heater element being in the vat and below the fry channel, said container being in heat exchange relationship through said upright support wall with a vat side walls at a level below the level of the fry channel and at the same level as the electric heater.

5. A cooking fat pre-warmer according to claim 4 including means in said vat for firstly propelling just heated oil along and through said fry channel, then secondly over and past the dip member after food goods have been cooked in the fry channel, and thirdly past said electric heater and then back onto the fry channel.

* * * * *